United States Patent
Lee et al.

(10) Patent No.: US 9,108,562 B2
(45) Date of Patent: Aug. 18, 2015

(54) SYSTEM FOR CONTROLLING VIRTUAL ENGINE SOUND AND METHOD THEREOF

(75) Inventors: Bong Ho Lee, Gyeonggi-do (KR); Jae Hyn Park, Gyeonggi-do (KR); Moonseok Lee, Gyeonggi-do (KR); Ki Soo Yoon, Gyeonggi-do (KR); Ji Hoon Jeong, Gyeonggi-do (KR); Ji Min Lim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 469 days.

(21) Appl. No.: 13/558,867

(22) Filed: Jul. 26, 2012

(65) Prior Publication Data
US 2013/0114827 A1    May 9, 2013

(30) Foreign Application Priority Data

Nov. 7, 2011  (KR) .......................... 10-2011-0115154

(51) Int. Cl.
*B60Q 5/00* (2006.01)
*G10K 15/04* (2006.01)

(52) U.S. Cl.
CPC ............. *B60Q 5/008* (2013.01); *B60L 2270/42* (2013.01); *G10K 15/04* (2013.01)

(58) Field of Classification Search
CPC ....... G10K 15/02; G10K 15/04; B60Q 5/008; B60Q 5/00; B60L 2270/42
USPC .............. 381/86, 102, 104–107; 701/36, 419, 701/434, 400, 22; 84/645, 627, 663, 604
See application file for complete search history.

(56) References Cited

U.S. PATENT DOCUMENTS

| | | | |
|---|---|---|---|
| 2008/0240461 A1* | 10/2008 | Nakamura et al. .............. | 381/81 |
| 2011/0085674 A1* | 4/2011 | Fujikawa ......................... | 381/86 |
| 2011/0093149 A1* | 4/2011 | Tanaka ............................ | 701/22 |
| 2012/0130580 A1* | 5/2012 | Omote et al. ................... | 701/22 |

FOREIGN PATENT DOCUMENTS

| | | |
|---|---|---|
| JP | 06289887 A | 10/1994 |
| JP | 2011084109 A | 4/2011 |
| KR | 10-1998-0059270 | 10/1998 |
| KR | 10-2010-0109197 | 10/2010 |

* cited by examiner

*Primary Examiner* — Vivian Chin
*Assistant Examiner* — David Ton
(74) *Attorney, Agent, or Firm* — Mintz Levin Cohn Ferris Glovsky and Popeo, P.C.; Peter F. Corless (57) ABSTRACT

Disclosed is a system and method for controlling a virtual engine sound of a hybrid vehicle or an electric vehicle. More specifically, the system includes a sensor for detecting when the vehicle is inside an enclosure; a virtual engine sound generation portion for generating the virtual engine sound of the vehicle; and a control portion for receiving data detected by the sensor to control the virtual engine sound based upon whether or not the vehicle is inside the enclosure, and transmitting a control signal corresponding to the data to the virtual engine generation portion.

18 Claims, 7 Drawing Sheets

SYSTEM FOR CONTROLLING VIRTUAL ENGINE SOUND AND METHOD THEREOF

CROSS-REFERENCE TO RELATED APPLICATION

This application claims priority to and the benefit of Korean Patent Application No. 10-2011-0115154 filed in the Korean Intellectual Property Office on Nov. 7, 2011, the entire contents of which are incorporated herein by reference.

BACKGROUND OF THE INVENTION (a) Field of the Invention

The present invention relates to a system and a method for controlling a virtual engine sound, and more particularly to a system and a method for controlling a virtual engine sound for a hybrid vehicle or an electric vehicle.

(b) Description of the Related Art

Environmentally friendly vehicles, such as a hybrid electric vehicle (HEV) or an electric vehicle (EV) are known for their quite operation and thus pedestrians have a difficult time hearing them coming down the road. More specifically, when hybrid electric vehicles (HEV) and the electric vehicles (EV) are driven by just the motor, the noise generated by the vehicle is greatly reduced. Accordingly, pedestrians, particularly a blind person, may have a difficult time hearing these kinds of vehicles approaching. Thus, in an effort to improve pedestrian safety, virtual engine sound systems (NESS) that output a virtual engine sound through a speaker have been implemented into hybrid and electric vehicles alike to allow pedestrians to easily identify an approaching vehicle.

These virtual engine sound systems (VESS) typically use driving information obtained from one or more sensors or control units installed in the vehicle to control the volume and operation of the virtual engine sound being output by the system. This information may include, for example, vehicle speed, the current angle of an accelerator pedal, the motor speed, etc.

However, an accurate virtual engine sound may be effected by external elements as well in which the vehicle is operating. Thus, the virtual engine sound system should control the volume and the operation of the virtual engine sound, according to these elements as well, however, the current systems do not. For example, the amount of noise required to project the sound appropriately inside a covered space (e.g., a garage or an enclosure) is less than is required in an outdoor environment. Therefore, when the virtual engine sound is generated based on the vehicle operating in an outdoor environment, when the vehicle is actually operating in an interior environment, the volume of the virtual engine sound in the interior environment can be overly loud and disturbing. Therefore, when the vehicle is operating in an interior environment, the virtual engine sound should be dynamically controlled accordingly.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system and a method for controlling a virtual engine sound having advantages of effectively controlling the virtual engine sound based on an environment in which the vehicle is operating. Another object of the present invention is to provide a system and a method for controlling a virtual engine sound having advantages of effectively controlling the virtual engine sound by determining whether the vehicle is in an interior environment or an exterior environment.

More specifically, the exemplary embodiment of the present invention includes a system for controlling a virtual engine sound of a hybrid vehicle or an electric vehicle. The system may include an detecting sensor configured to detect when the vehicle is in an interior environment; a virtual engine sound generation portion or unit configured to generate the virtual engine sound for the vehicle; and a control portion configured to receive data detected by the detecting sensor and based on the data control the virtual engine sound accordingly by transmitting a control signal corresponding to the data to the virtual engine generation portion.

The detecting sensor may be, for example, a Global Positioning System (GPS), and the detecting sensor may be a photo sensor, or any other sensor for detecting an object. More specifically, the detecting sensor may be configured to detect an object's positioning above the vehicle.

The system may further include: a measuring portion or unit measuring driving information related to the vehicle. The control portion or unit is configured to control the virtual engine sound according to the driving information measured by the measuring portion.

A method for controlling a virtual engine sound of a hybrid vehicle or an electric vehicle according to another exemplary embodiment of the present invention may include: generating, by a control unit, the virtual engine sound according to a predetermined virtual engine sound; detecting, by a sensor when the vehicle is in inside the enclosure; and controlling, by the control unit, the predetermined virtual engine sound according to the detected result, by e.g., reducing the volume of the predetermined virtual engine sound when the vehicle is inside the enclosure.

More specifically, the sensor may detect when the vehicle is inside the enclosure by measuring a receiving ratio of a Global Positioning System (GPS) in the vehicle, and comparing the measured receiving ratio with a predetermined receiving ratio. Alternatively, the detecting sensor may measure the receiving ratio of a Global Positioning System (GPS) in the vehicle, and compare a change of the receiving ratio measured with a predetermined change of the receiving ratio. The sensor may also determine whether an object above the vehicle is close to the vehicle (e.g., a roof of a garage). Additionally, the sensor may also measure the quantity of light outside the vehicle, and compare whether the measured quantity of light is less than a predetermined quantity of light.

DESCRIPTION OF SYMBOLS

1: vehicle
10: detecting sensor
11: receiver of Global Positioning System (GPS)

13: sensor for detecting object
15: photo sensor
20: measuring portion
30: virtual engine sound generation portion
40: control portion

DETAILED DESCRIPTION OF THE EMBODIMENTS

Exemplary embodiments of the present invention will be described in detail with reference to the accompanying drawings so as to be easily practiced by a person skilled in the art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

Furthermore, control logic utilized to execute the exemplary embodiments of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Furthermore, the various "portions" described herein may be embodied as a single control unit or as a plurality of control unit without departing from the overall concept and intent of the illustrative embodiment of the present invention. Accordingly, although the figures represent these portions as separate devices, these portions may be embodied within a single control unit as well.

Such exemplary embodiments are exemplary embodiments according to the present invention. Since a person skilled in the art can realize the present invention in various forms of exemplary embodiments, the scope of the present invention is not limited to exemplary embodiments which will be hereinafter described.

Figure 1:
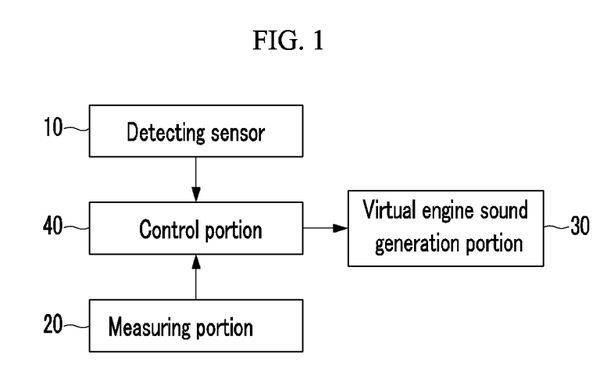
FIG. 1 is a schematic diagram of a system for controlling a virtual engine sound vehicle according to an exemplary embodiment of the present invention.
Figure 2:
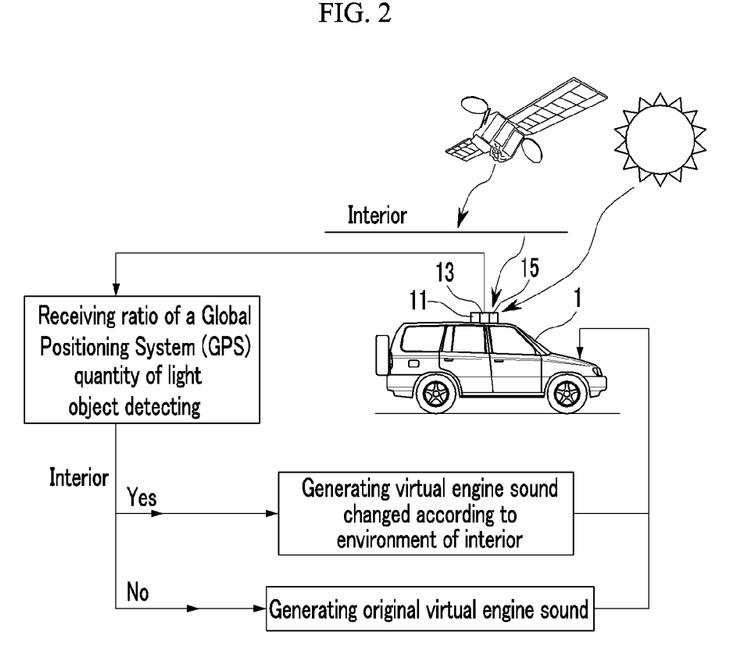
FIG. 2 is a schematic diagram illustrating an operation of a system for controlling a virtual engine sound vehicle according to an exemplary embodiment of the present invention.

FIG. 1 is a schematic diagram of a system for controlling a virtual engine sound vehicle according to an exemplary embodiment of the present invention, FIG. 2 is a schematic diagram illustrating an operation of a system for controlling a virtual engine sound vehicle according to an exemplary embodiment of the present invention.

A system for controlling a virtual engine sound is applied to a vehicle 1 such as a hybrid vehicle or an electric vehicle driven by a motor, and is configured to control and generate a virtual engine sound according to the external environment of the vehicle 1 when the vehicle is driven by the motor or is stopped.

Referring to FIG. 1 and FIG. 2, the system for controlling the virtual engine sound includes a detecting sensor 10, a measuring portion 20, a virtual engine sound generation portion 30 and a control portion 40. As stated above, for example, the control portion, and the measuring portion although depicts as separate devices may be embodied as a single control unit.

The detecting sensor 10 may be installed on the vehicle 1 to detect whether the vehicle 1 is inside an enclosure (e.g., a covered space, a garage, a building, or the like). When the vehicle is in an interior environment, e.g., walls of a building or walls of a tunnel surrounds the vehicle 1, and the detecting sensor 10 detects that an environmental condition has been changed due to the, e.g., walls of the building or the walls of the tunnel. The detecting sensor 10 detects signals which determine when the vehicle is in an interior environment by using sensors of various types For example, a receiver of a global positioning system (GPS) 11 may detect a receiving ratio of a position signal of a satellite or a change thereof, a photo sensor 15 may detect the quantity of light, or a sensor 13 may be configured to detect an object in over short range to determine whether the vehicle is inside the enclosure or not. The method for determining whether the vehicle is in the interior by using such sensors will be described in more detail below.

The measuring portion 20 may measure or monitor driving information related to the vehicle such as the speed of the motor, a speed of the vehicle, an opening angle of an accelerator pedal or an opening angle of a throttle valve, and transmit the driving information measured to the control portion 40.

The virtual engine sound generation portion 30 generates the virtual engine sound according to signals from the control portion 40 when the vehicle 1 is driven by the motor or is stopped. At this time, the user can turn on or off a virtual engine sound system by using a control apparatus (not shown) in the vehicle 1. According to an exemplary embodiment, the virtual engine sound generation portion 30 may output the virtual engine sound to the exterior of the vehicle 1 through a speaker (not shown) installed in an engine compartment (not shown).

The control portion 40 may transmit a control signal for the virtual engine sound to the virtual engine sound generation portion 30. The control portion 40 may receive data from the detecting sensor 10 to control the virtual engine sound accordingly. Specifically, when the virtual engine sound is generated, the control portion 40 is configured to compare the data received from the detecting sensor 10 with a predetermined data to determine whether the vehicle 1 is inside the enclosure, and to control the virtual engine sound according to this determination. When the vehicle 1 is inside the enclosure, the control portion 40 is configured to control the volume of the sound output by the system, a sound pressure and frequency of the virtual engine sound, and so on.

Additionally, the control portion 40 may also receive data from the measuring portion 20 to control the virtual engine sound accordingly. Specifically, when the vehicle 1 runs, the control portion 40 is configured to determine driving information related to the vehicle 1 based on a comparison between the data received from the measuring portion 20 and a predetermined data. Subsequently, the control portion utilizes this comparison to control the virtual engine sound according to the driving information of the vehicle 1. Also, the control portion 40 can be configured to control the virtual engine sound based on the data received from detecting sensor 10 and the data received from the measuring portion 20. That is, the control portion 40 can be configured to control the virtual engine sound based on the state of the vehicle and whether or not the vehicle is inside the enclosure.

The control method of the system for controlling the virtual engine sound will now be described in detail.

Figure 3:
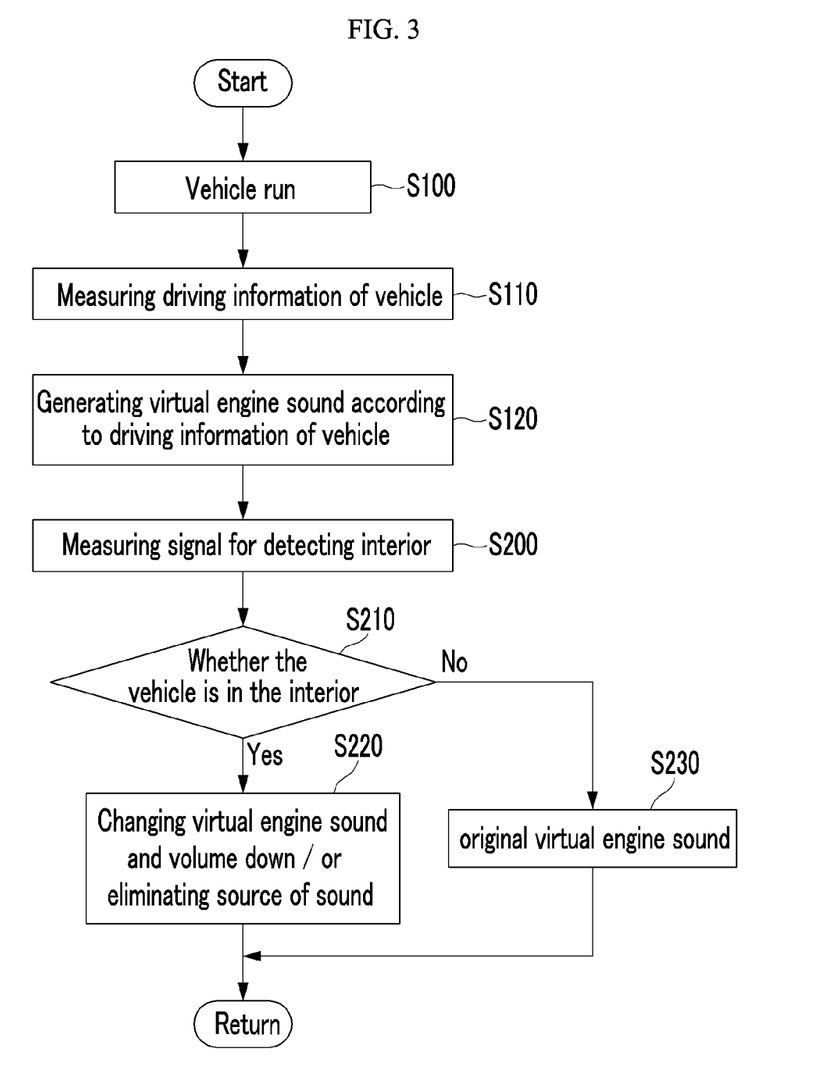
FIG. 3 to FIG. 7 are flowcharts of a method for controlling a virtual engine sound vehicle according to an exemplary embodiment of the present invention.

FIG. 3 to FIG. 7 are flowcharts of a method for controlling a virtual engine sound vehicle according to an exemplary embodiment of the present invention. Referring to FIG. 3, when the electric vehicle or the hybrid vehicle is determined to be running at step S100, the measuring portion 20 measures the driving information of the vehicle, e.g., the speed of the motor, the speed of the vehicle, the opening angle of the accelerator pedal or the opening angle of the throttle valve, in step S110. The control portion 40 then receives the driving information from the measuring portion 20, generates a control signal for the virtual engine sound that corresponds to the driving information of the vehicle, and transmits the control signal to the virtual engine sound generation portion 30. Accordingly, the virtual engine sound generation portion 30 generates the virtual engine sound according to the control signal for the virtual engine sound at step S120. Once the detecting sensor 10 provides signals to the control portion 40 for analyzation at step S200, the control portion 40 determines whether the vehicle 1 is inside the enclosure based on the signals measured by the detecting sensor 10 at step S210.

When the vehicle 1 is inside the enclosure, the control portion 40 adjusts the virtual engine sound accordingly. Specifically, the control portion 40 changes the control signal for the virtual engine sound to reduce the volume and the sound pressure of the virtual engine sound control signal or eliminate a sound source of the virtual engine sound. Accordingly, the virtual engine sound generation portion 30 generates the virtual engine sound based on the control signal for the virtual engine sound at step S220. When, however, the vehicle 1 is not inside the enclosure, the virtual engine sound that has been previously output is maintained at step S230.

Figure 4:
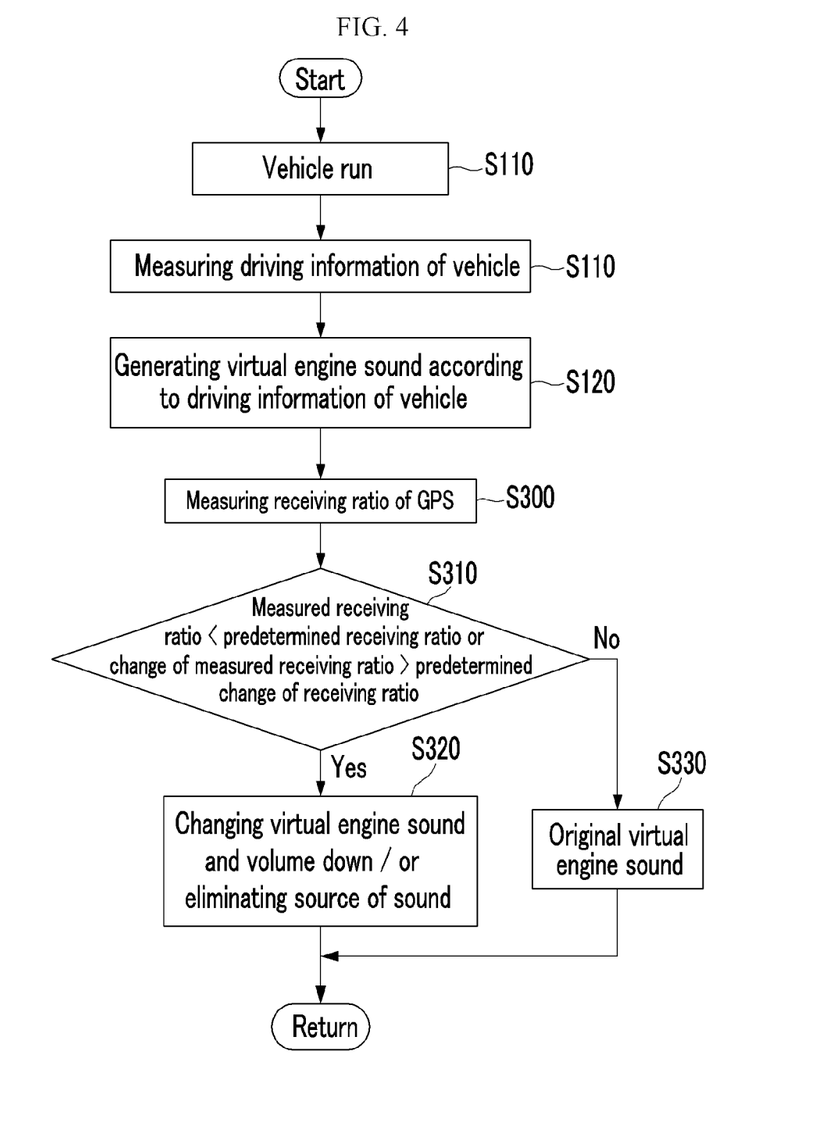

As shown in FIG. 4, when the receiver of the global positioning system (GPS) 11 is used as the detecting sensor 10, the receiver 11 measures the receiving ratio of the position signal of a satellite to determine whether the vehicle 1 inside the enclosure or not. That is, when the vehicle 1 is inside the enclosure, the receiving ratio of the receiver 11 decreases due to influence from the walls surrounding the vehicle.

In further detail, the receiver of the global positioning system (GPS) 11 continuously calculates the receiving ratio while the vehicle is being operated at step S300. The control portion 40 determines whether the vehicle 1 is inside the enclosure based on a comparison between the measured receiving ratio and the predetermined receiving ratio or a comparison between a change in the measured receiving ratio and a predetermined change in the receiving ratio at step S310.

When the measured receiving ratio is less than the predetermined receiving ratio or when the change in the measured receiving ratio is less than the predetermined change in the receiving ratio, e.g., when the vehicle 1 goes inside a parking garage, the control portion 40 changes the control signal for the virtual engine sound to reduce the volume and the sound pressure output by the virtual engine sound or eliminate the sound source of the virtual engine sound at step S320. When the vehicle 1 is not inside the enclosure, the virtual engine sound that has been previously output is maintained at step S330.

Figure 5:
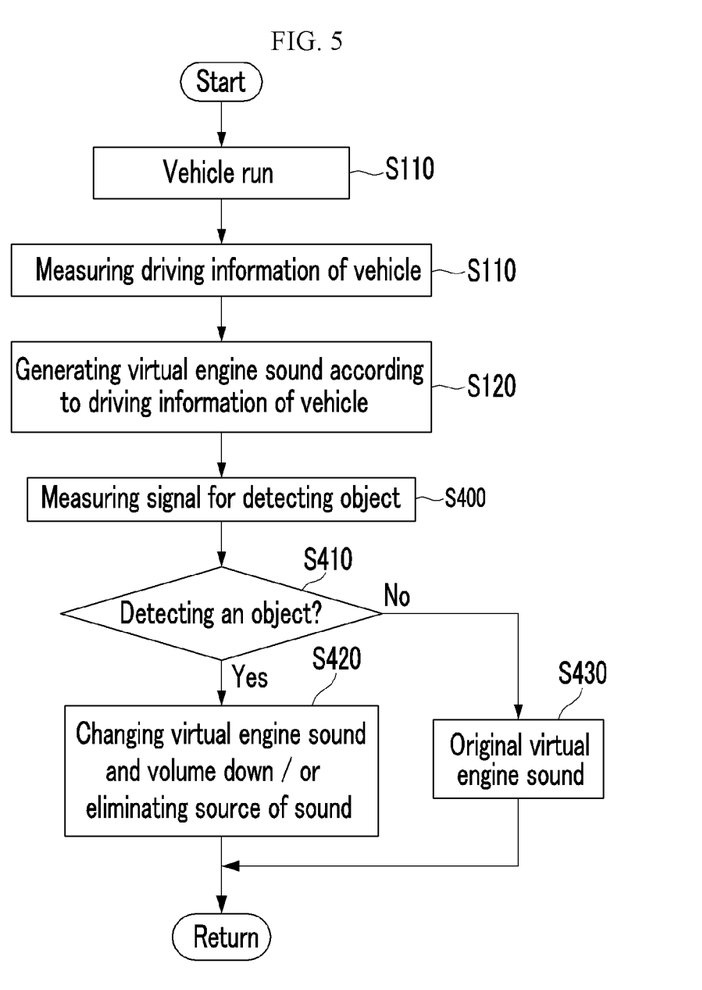

As shown in FIG. 5, when the sensor 13 for detecting the object is used as the detecting sensor 10, the sensor 13 for detecting the object detects objects within over a short range to provide data to determine whether the vehicle 1 is inside the enclosure or not. That is, when the vehicle 1 is inside the enclosure, a ceiling above the vehicle may be detected by this sensor 13 since it is typically no more and a few feet or meters away from the roof of the vehicle. The sensor 13 may be an ultrasonic wave sensor, for example. More specifically, this type of sensor 13 preferably detects the object positioning above the vehicle 1.

The sensor 13 may be configured to continuously measure a detection signal in relation to objects (e.g., above the vehicle) when the vehicle 1 is operating at step S400. The control portion 40 receives the detection signal for the object from the sensor 13 for detecting the object, and determines whether the vehicle 1 is inside the enclosure based on the received detection signal for the object at step S410.

When the control portion 40 receives the detection signal related to an object, this indicates that the vehicle may be inside the enclosure and, the control portion 40 changes the control signal for the virtual engine sound to reduce the volume and the sound pressure of the virtual engine sound or eliminate the sound source of the virtual engine sound as a result at step S420. When the control portion 40 is does not receive a detection signal from the sensor 13, this means that the vehicle is outside and the virtual engine sound that has been previously output should be maintained at step S430.

Figure 6:
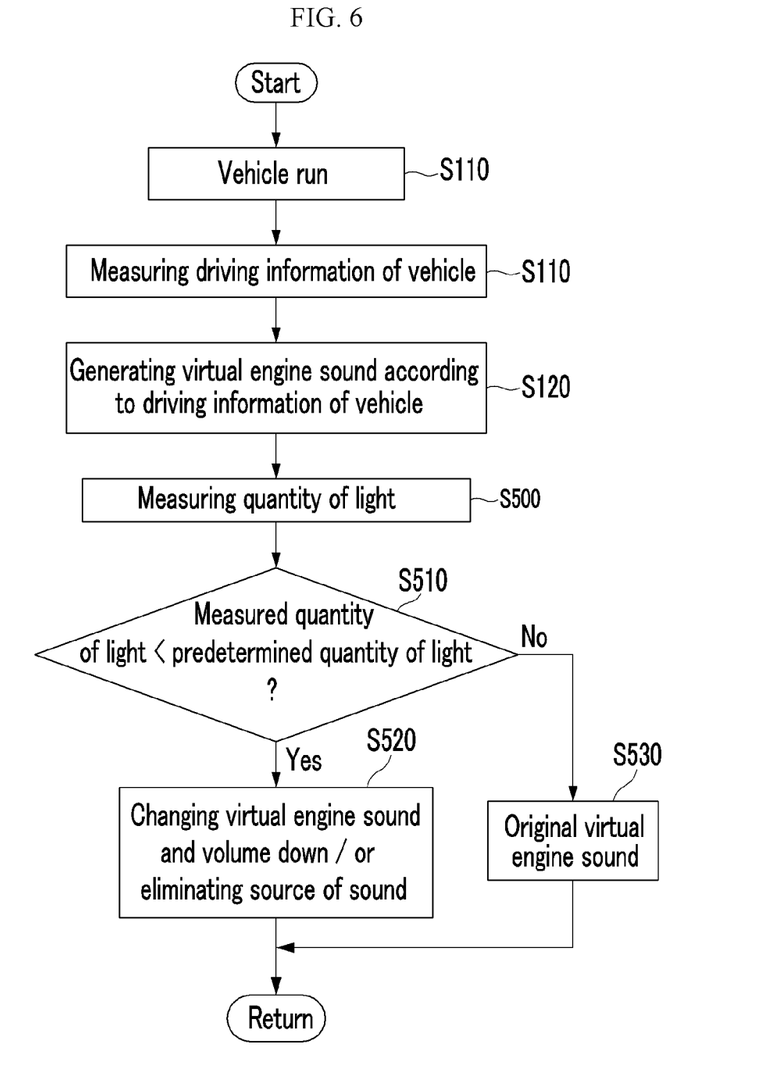

As shown in FIG. 6, when the photo sensor 15 is used as the detecting sensor 10, the photo sensor 15 measures the quantity of light to detect whether the vehicle 1 is inside the enclosure. That is, when the vehicle 1 is inside the enclosure, the quantity of light inside the enclosure is less than the amount of light outdoors due to influences from, e.g., walls.

In further detail, the photo sensor 15 continuously measures the quantity of light in the ambient environment around the vehicle 1 as the vehicle is being operated in step S500. The control portion 40 determines whether the vehicle 1 is inside the enclosure based on a comparison between the measured quantity of light and a predetermined quantity of light for that particular time of day at step S510.

When the measure quantity of light is less than the predetermined quantity of light for that particular time of day, the vehicle is determined to be inside the enclosure, and the control portion 40 changes the control signal for the virtual engine sound to reduce the volume and the sound pressure of the virtual engine sound or eliminate the sound source of the virtual engine sound at step S520. When light is greater than a predetermined quantity for that particular time of day, the virtual engine sound that has been previously output should preferably be maintained at step S530.

Figure 7:
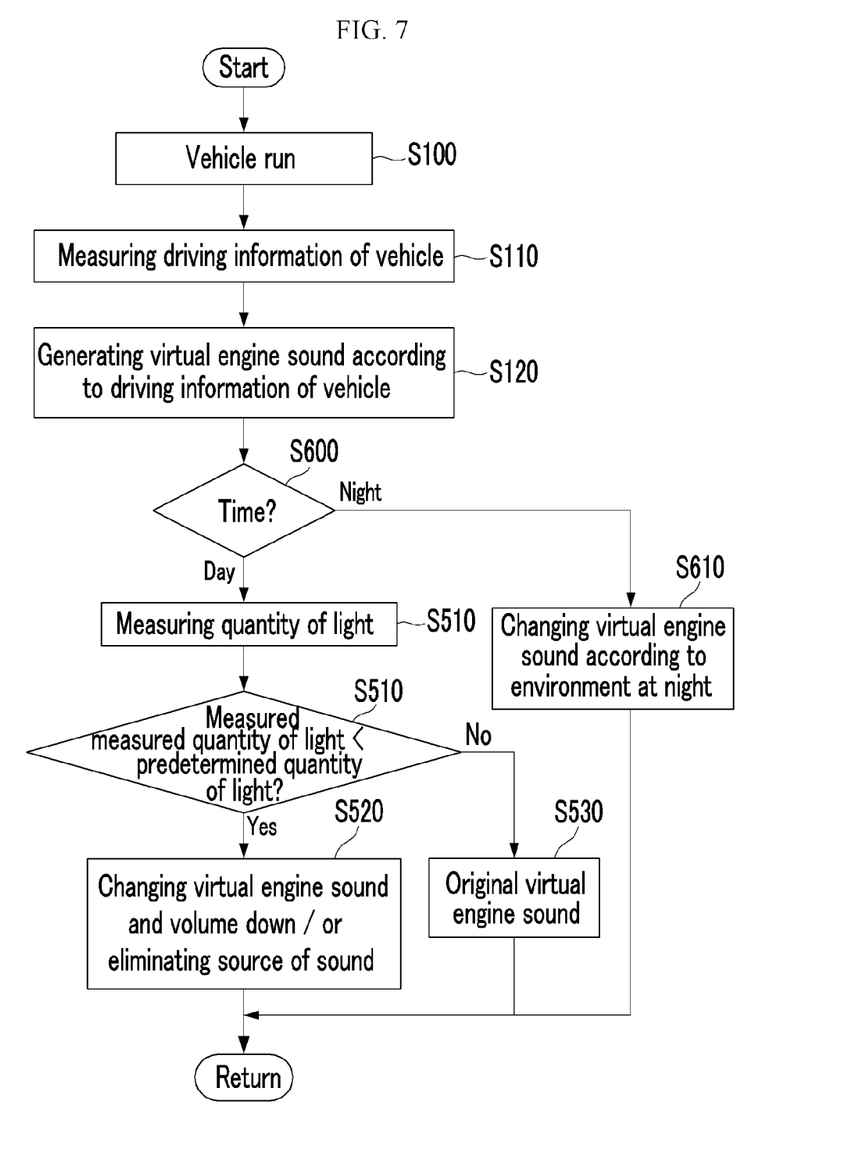

As shown in FIG. 7, when the photo sensor 15 is used as the interior detecting sensor 10, the control portion 40 can determines whether the vehicle 1 is running at night or in the daytime at step S600. This is necessary because the quantity of light in the daytime is more than that at night.

When the vehicle is determined to be operating at night, the control portion 40 controls the virtual engine sound according to night time environments based on an expected quantity of light comparison between an inside location and an outside location at night at step S610. For example, at night the quantity of light outside may be less than the quantity of light inside and thus, the illustrative embodiment of the present invention may be controlled accordingly. When the vehicle is being operated in the daytime, the method for controlling the virtual engine sound is the same as that shown in FIG. 6

According to the exemplary embodiment, the method for controlling the virtual engine sound may be configured to measure driving information related to the vehicle, and to generate the virtual engine sound based on the driving information of the vehicle. However, it is not limited to the embodiments described herein. That is, the method can be configured to generate the virtual engine sound which is set arbitrarily without the driving information of the vehicle 1 when the vehicle 1 is driven by the motor.

Also, according to the exemplary embodiment, the method for controlling the virtual engine sound may be configured to control the virtual engine sound depending upon whether or not the vehicle 1 is determined to be inside the enclosure dynamically. However, it is not limited to the embodiments described herein. That is, the control portion 40 may be configured to control the virtual engine sound considering the driving information of the vehicle when the vehicle 1 is inside the enclosure as well.

Accordingly, the exemplary embodiment of the present invention may be effectively controlled according to the external environment of the vehicle and based on a determination of whether the vehicle is inside the enclosure or not.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for controlling a virtual engine sound of a hybrid vehicle or an electric vehicle, comprising:
    a sensor configured to detect when the vehicle is inside an enclosure;
    a virtual engine sound generation portion configured to generate the virtual engine sound of the vehicle; and
    a control portion configured to receive data detected by the sensor to control the virtual engine sound based upon whether or not the vehicle is inside the enclosure, and transmit a control signal corresponding to the data received to the virtual engine generation portion to control sound output accordingly.

2. The system of claim 1, wherein the sensor is Global Positioning System (GPS) receiver.

3. The system of claim 1, wherein the sensor is a photo sensor.

4. The system of claim 1, wherein the sensor is a sensor configured to detect an object, and
    wherein the sensor is configured to detect an object's positioning above the vehicle.

5. The system of claim 1, further comprising a measuring portion configured to measure driving information related to operation of the vehicle, and
    wherein the control portion is configured to control the virtual engine sound based on the driving information of the vehicle measured by the measuring portion.

6. A method for controlling a virtual engine sound of a hybrid vehicle or an electric vehicle, comprises
    generating, by a virtual engine sound generation portion, the virtual engine sound based on a predetermined virtual engine sound;
    detecting, by a sensor, when the vehicle is inside the enclosure; and
    controlling, by a control unit, the predetermined virtual engine sound according to the detected result.

7. The method of claim 6, wherein detecting whether the vehicle is inside the enclosure comprises:
    measuring a receiving ratio of a Global Positioning System (GPS) in the vehicle; and
    comparing, by the control unit, the measured receiving ratio with a predetermined receiving ratio.

8. The method of claim 6, wherein detecting whether the vehicle is inside the enclosure comprises:
    measuring the receiving ratio of a Global Positioning System (GPS) in the vehicle; and
    comparing, by the control unit, a change of the measured receiving ratio with a predetermined change of the receiving ratio.

9. The method of claim 6, wherein detecting whether the vehicle is inside the enclosure comprises determining whether an object above the vehicle is within a predetermined distance range from the vehicle.

10. The method of claim 6, wherein detecting whether the vehicle is inside the enclosure comprises
    measuring a quantity of light outside the vehicle; and
    comparing, by the control unit, whether the measured quantity of light is less than a predetermined quantity of light, wherein when the measure quantity of light is less than the predetermined quantity of light, the vehicle is determined to be inside the enclosure.

11. The method of claim 6, wherein controlling the predetermined virtual engine sound according to the detected result comprises reducing a volume of the predetermined virtual engine sound when the vehicle is inside the enclosure.

12. The method of claim 11, wherein the predetermined virtual engine sound is set based on driving information of the vehicle detected while the vehicle operating.

13. A non-transitory computer readable medium containing program instructions executed by a processor or controller, the computer readable medium comprising:
    program instructions that generate a virtual engine sound based on a predetermined virtual engine sound;
    program instructions that continuously monitor and determine when a vehicle is inside an enclosure; and
    program instructions that control the predetermined virtual engine sound based upon whether a sensor has detected that the vehicle is inside the enclosure or not, wherein when the vehicle is determined to be inside the enclosure, a volume of the virtual engine sound is reduced.

14. The non-transitory computer readable medium of claim 13, wherein the program instructions that determine when the vehicle is inside the enclosure include:
    program instructions that measure a receiving ratio of a Global Positioning System (GPS) in the vehicle; and
    program instructions that compare the measured receiving ratio with a predetermined receiving ratio.

15. The non-transitory computer readable medium of claim 13, wherein the program instructions that determine when the vehicle is inside the enclosure comprise:
    program instructions that measure the receiving ratio of a Global Positioning System (GPS) in the vehicle; and
    program instructions that compare a change of the measured receiving ratio with a predetermined change of the receiving ratio.

16. The non-transitory computer readable medium of claim 13, wherein the program instructions that determine when the vehicle is inside the enclosure comprise:
    program instructions that determine when an object above the vehicle is within a predetermined distance range from the vehicle.

17. The non-transitory computer readable medium of claim 13, wherein the program instructions that determine when the vehicle is inside the enclosure comprise:
    program instructions that measure a quantity of light outside the vehicle; and
    program instructions that compare whether the measured quantity of light is less than a predetermined quantity of light, wherein when the measure quantity of light is less than the predetermined quantity of light, the vehicle is determined to be inside the enclosure.

18. The non-transitory computer readable medium of claim 13, wherein the predetermined virtual engine sound is additionally set based on driving information of the vehicle detected while the vehicle operating.

* * * * *